United States Patent [19]

Smith

[11] 4,256,622
[45] Mar. 17, 1981

[54] CURABLE HYDROXY RESIN COMPOSITIONS

[75] Inventor: Harry A. Smith, Midland, Mich.

[73] Assignee: The Dow Chemical Company, Midland, Mich.

[21] Appl. No.: 110,048

[22] Filed: Jan. 7, 1980

Related U.S. Application Data

[63] Continuation-in-part of Ser. No. 897,321, Apr. 18, 1978, abandoned, which is a continuation-in-part of Ser. No. 845,188, Oct. 25, 1977, abandoned.

[51] Int. Cl.$^3$ .................... C08K 5/06; C08L 63/02; C08L 61/10; C08L 61/28
[52] U.S. Cl. .................... 260/33.2 R; 260/33.2 EP; 260/38; 260/39 R; 525/58; 525/134; 525/143; 525/162; 525/337; 525/344; 525/353; 525/442; 525/443; 525/480; 525/481; 525/485; 525/509; 525/510; 525/511
[58] Field of Search ................. 260/33.2 R; 525/58, 525/134, 143, 162, 337, 344, 353, 442, 443, 480, 481, 509, 510

[56] References Cited

U.S. PATENT DOCUMENTS

| | | | |
|---|---|---|---|
| 3,267,174 | 8/1966 | Fry et al. | 260/851 |
| 3,810,853 | 5/1974 | James et al. | 260/850 |
| 3,920,595 | 11/1975 | Anderson et al. | 260/22 CQ |
| 3,945,961 | 3/1976 | Blank | 260/850 |
| 4,065,415 | 12/1977 | Chistenson et al. | 260/17.4 SG |

Primary Examiner—Carman J. Seccuro
Attorney, Agent, or Firm—David H. Fifield; Douglas N. Deline

[57] ABSTRACT

A four-component composition is disclosed comprising 100 parts of a non-aminoplast hydroxyl-bearing polymer; about 5–100 parts of a (poly)glycol monoether having an atmospheric boiling point of about 300° C. or greater; an aminoplast or phenolic resin capable of curing the hydroxyl-bearing polymer and a strong acid catalyst for the reaction between the first and third components. Optionally, a pigment may be added to the composition.

16 Claims, No Drawings

CURABLE HYDROXY RESIN COMPOSITIONS

CROSS-REFERENCE TO RELATED APPLICATION

This application is a continuation-in-part of my copending application Ser. No. 897,321 filed Apr. 18, 1978, now abandoned which is a continuation-in-part of my copending application Ser. No. 845,188 filed Oct. 25, 1977 now abandoned.

BACKGROUND OF THE INVENTION

The invention relates to the use of a reactive diluent in common coating compositions made up of hydroxy-functional resins which are curable, by means of an aminoplast or phenolic resin, upon heating in the presence of a strong acid catalyst. Presently, low boiling diluents are employed as solvents for coating compositions and are removed upon heating said compositions in the curing process.

In U.S. Pat. No. 3,238,160, alkyd resins are cured with various formaldehyde based resins from a solvent of 150° C.–300° C. boiling point. The amount of solvent is at least 2-3 times the amounts employed herein. U.S. Pat. No. 3,920,595 teaches solvent based alkyds cured with aminoplast resins. The solvents described are alkanols and polyols. U.S. Pat. No. 4,038,225 shows hydrocarbons, alkanols and low-boiling glycol ethers as solvents for an alkyd-aminoplast coating system.

SUMMARY OF THE INVENTION

The instant invention comprises standard coating mixtures of non-aminoplast hydroxy-functional resins in admixture with aminoplast or phenolic curing agents therefor and a catalyst for the reaction between the two and, as a reactive diluent, a (poly)glycol monoether which boils at greater than or equal to about 300° C. at 760 mm mercury pressure. The invention composition differs from the solvent-based coatings previously employed in the art in that it may be permanently incorporated, preferably with about 80 percent or greater and more preferably about 90 percent or greater retention, in the final coating instead of being evaporated out as is commonly the case and the resultant coatings do not suffer losses in their physical properties as might be expected.

The invention comprises a curable composition comprising component (A) 100 parts by weight of a non-aminoplast hydroxy-bearing polymer which represents x-hydroxyl equivalents; component (B) about 5 to about 100 parts by weight which represents y-hyxroxyl equivalents of a (poly)glycol monoether represented by the formula:

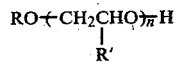

wherein R is a hydrocarbyl group of 1 to about 20 carbon atoms, R' is independently, each occurrence, hydrogen, methyl or ethyl, and n is a positive number, said (poly)glycol monoether having an atmospheric boiling point of about 300° C. or greater; component (C) an aminoplast or phenolic resin, capable of curing component (A) to a tack-free state, present in a quantity such that z equivalents of said resin are present, z being equal to from about $2(x+y)$ up to about $10(x+y)$; and component (D) a catalytic amount of a strong acid catalyst for the reaction between components (A) and (C). The invention further comprises the above composition which has been heated at a temperature and for a length of time sufficient to cure same to a tack-free finish. The invention composition may optionally comprise a pigment of the nature commonly employed in paints and other compositions as well as other common additives such as flow control agents, wetting agents and the like.

DETAILED DESCRIPTION OF THE INVENTION

Component (A) of the invention is suitably any hydroxy-bearing polymer which is commonly cured with an aminoplast or phenolic resin to form films and coatings. Component (A) suitably has at least two and preferably three or more free-hydroxyl groups. Such polymers are the free-hydroxyl containing polyesters or alkyds such as are obtained by condensing di- or polycarboxylic acids with diols, glycols, triols or higher polyols in such a fashion and ratios that free-hydroxyls remain unreacted for further curing by means of the aminoplast resin. Solid epoxy resins, such as extended diglycidyl ethers of bisphenols, for example:

wherein $m > 1$, are also suitable as component (A).

Another class of polymers suitably employed as component (A) are those obtained by polymerization of the unsaturated portion of vinyl monomers which bear or may be modified to bear free-hydroxyl groups which are ultimately pendant from the polyethylenic backbone. Examples of such polymers are poly(vinyl alcohols) which may be obtained by the hydrolysis of polymers derived from the polymerization of vinyl acetate with or without other vinylic unsaturated comonomers, from poly(hydroxyalkylacrylates) such as hydroxyethylacrylate and hydroxypropylacrylate with or without other comonomers and poly($\alpha,\beta$-unsaturated acids) derived from the polymerization of $\alpha,\beta$-unsaturated monomeric acids with or without other comonomers or by the polymerization and subsequent hydrolysis of esters thereof. Such monomeric acids are acrylic acid, methacrylic acid, itaconic acid, maleic acid, citraconic acid, cinamic acid and the like.

Component (A) polymers bearing the necessary hydroxy-functional groups have an equivalent weight which may be calculated by standard methods. For the purposes of this invention, 100 parts by weight of said polymer has arbitrarily been designated as x-hydroxyl equivalents. For example, if a given polymer is known to have an equivalent weight of 20 grams per equivalent, in the invention composition comprising 100 grams of said polymer, x equals 5. This number x is used together with another arbitrary function y for component (B) to determine the appropriate amount of component (C) to be employed in the invention composition. This is discussed more fully below. For the purposes of this invention, free carboxylic acid groups, -COOH, should be considered as one hydroxyl functional group and oxirane groups as two hydroxyl functional groups.

Component (B) comprises about 5 to about 100 parts by weight, preferably about 20 to about 85 and most preferably about 30 to about 70 parts by weight, of a (poly)glycol monoether represented by the formula:

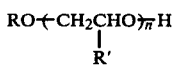

which has an atmospheric boiling point (i.e., the boiling point at 760 mm mercury) of about 300° C. or greater. Such (poly)glycol monoethers are well-known in the art and are prepared by reacting ethylene oxide, propylene oxide, 1,2-butylene oxide or mixtures thereof with an initiator ROH to give a mixture of products of varying lengths in the oxyalkylene chain. For this reason, n represents a statistical weight average indicating the average number of oxyalkylene units per mole of the monoether product. The chain

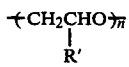

may consist of oxyethylene units alone, oxypropylene units alone, oxy-1,2-butylene units alone, or mixtures thereof in either block or heteric arrangement which is determined by either sequential addition of ethylene oxide, propylene oxide, 1,2-butylene oxide or random addition thereof.

Preferably, R' is methyl in one or more occurrences, more preferably methyl in the majority of occurrences and most preferably methyl in all occurrences. This is preferred to provide sufficient water resistance in a cured composition. Preferably, n is equal to about 4 or greater and most preferably about 4.3 or greater. R is the hydrocarbyl group remaining from the initiator molecule and is suitably selected from alkyl, alkenyl, alkaryl, aralkyl and aryl groups comprising 1 to about 20 carbon atoms. Preferably, R is alkyl of 1 to 15 carbon atoms, phenyl, or alkylphenyl of 7 to 15 carbon atoms and most preferably R is an alkyl group of 1 to 4 carbon atoms. In one preferred embodiment, the number of carbon atoms in R and

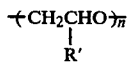

combined total about 12 or greater. Some examples of suitable monoethers for component (B) are shown in the following table together with their approximate atmospheric boiling points.

TABLE I

| Component (B) | | | |
|---|---|---|---|
| R | R' | n | Approx. Atmosph. Boiling Point °C. |
| $CH_3$ | all $CH_3$ | 5.5 | 367° |
| $CH_3$ | all $CH_3$ | 4.3 | 307° |
| $C_{13}H_{28}$ | all H | 3 | >350° |
| $C_4H_9$ | all $CH_3$ | 8 | >350° |

Preferably, component (B) has an atmospheric boiling point of about 310° C. or greater.

Component (C) is an aminoplast or phenolic resin, capable of curing component (A) to a tack-free state, and is unreactive in the composition under normal conditions but becomes reactive with component (A) at elevated temperatures on the order of 100° C.–250° C., preferably 125° C.–200° C. for a time sufficient to create the desired tack-free state, usually about 5–60 minutes or more. Suitable curing agents are aminoplast resins such as melamine-formaldehyde condensation products or urea-formaldehyde condensation products commonly available for this purpose and phenolic resole resins derived from the condensation of phenols and aldehydes and which are commonly used to cure the hydroxy-bearing solid epoxy resins previously described. Melamine-formaldehyde condensation products, such as hexamethoxymethyl melamine, give products of superior quality in the invention.

The quantity of component (C) to be employed is such that z equivalents of the aminoplast or phenolic resin are present in the invention composition, z being equal to from about 2 times the sum of $x+y$ up to about 10 times the sum of $x+y$. The equivalent weights of aminoplast and phenolic resins are commonly available from the manufacturers thereof. Knowing the hydroxyl equivalents present in components (A) and (B), the amount of component (C) can then be calculated on the basis of z which is derivable from x and y. Preferably, z is equal to at least about 2.5 times the sume of $x+y$ and is most preferably at least about 3 times the sum of $x+y$. Preferably, z is less than about 8 times the sum of $x+y$; and is most preferably less than about 7 times the sum of $x+y$.

As the examples illustrate, varied amounts of aminoplast curing agent, component (C), are needed to attain better than about 90 percent retention of component (B). Roughly, for the polyester of Examples 1–6 and 26–28, $z/(x+y)$ will be about 2 or greater; for the acrylic of Examples 7–13 about 3.5 or greater; for the epoxy of Examples 14–17 about 6.5 or greater; for the polyester of Examples 18–21 about 4.5 or greater; and for the acrylic of Examples 22–25 about 5 or greater.

Component (D) is a catalyst which catalyzes the reaction between the hydroxyl-bearing component (A) polymer and the aminoplast or phenolic curing agent which is component (C). Suitably, any strong acid may be employed for this purpose. Typical such catalysts are organosulfonic acids or their amine salts, sulfuric acid or its amine salts, zinc fluoroborate, phosphoric acid, boron trifluoride, (or its etherate), and the like. An organosulfonic acid or its amine salt such as toluenesulfonic acid is preferred as component (D). Suitably, about 0.05 to about 2 parts by weight of component (D) are sufficient to catalyze the curing reaction, and preferably more than about 0.1 and preferably less than about 1 part by weight is employed.

The curable composition of the invention is suitably prepared by simply mixing the four components in any order at ambient temperature or slightly elevated temperatures less than the temperature required for the curing reaction. The curable composition of the invention may suitably be heated to about 50° C.–100° C. without effecting a premature cure. This facilitates handling, mixing and application of the invention composition. If desired, standard pigments such as titanium oxides, chromium oxides, zinc oxides and the like may be added in suitable amounts to impart a desired color to the invention composition. Similarly, surfactants, wetting agents or flow control agents may optionally be added to the composition as is common in the art.

The invention composition is applied to a substrate by any suitable means to form a film or coating thereon and the film or coating is then heated to the curing temperature by means commonly used in the art such as a hot air oven, a bank of infrared heat lamps or the like.

SPECIFIC EMBODIMENTS

The following examples serve to illustrate the compositions of the invention, the curing and employment thereof for the preparation of films and coatings. Unless otherwise designated, the term "parts" when employed herein means parts by weight. "Hot tack" is measured by drawing a wooden tongue depressor across a cured coating immediately after curing. If no mark is visible, the coating is considered tack-free.

EXAMPLE 1

Polyester Based Composition

About 5 grams of a commercial polyester sold under the name Cargill Polyester 5760 and containing 10 percent ethoxyethyl acetate is blended with about 1.64 gram DOWANOL polypropylene glycol monomethyl ether, which is a component (B) represented by the formula:

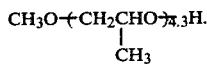

About 2.43 grams Cymel 301 hexamethoxymethyl melamine is added as component (C), this amount being such that z is equal to about $2.0(x+y)$ equivalents and about 0.09 gram of a 96 percent sulfuric acid solution is blended in with the other three components. This invention composition is cast as a film on an aluminum panel and cured at 150° C. for 5 minutes. The cured film exhibits no hot tack, has a Gardner reverse impact resistance of about 30 inch pounds and shows good solvent resistance. A weight loss of about 14 percent occurs and about 100 percent of component (B) is retained in the coating.

EXAMPLE 2

Comparative

In the manner of Example 1, a composition of like makeup is prepared except that component (B) is replaced with an equal weight of ethoxyethyl acetate and the quantity of component (C) is reduced to about 1.93 grams, the amount of curing agent such that z is about equal to 2.3x. A film is cast and cured in the same fashion as in Example 1. The physical properties are about the same as those of the cured film in Example 1 with no hot tack, a reverse impact resistance of slightly less than 20 inch pounds and good solvent resistance with about 37 percent weight loss upon curing, or about 100 percent of the volatiles including the solvent.

EXAMPLES 3–5

Polyester Based Compositions

In the same manner as Examples 1 and 2, a control and two compositions of the invention are prepared, coated and cured under the same conditions and utilizing the same materials for components (A), (B), (C) and (D) as in Examples 1-2. In Examples 3–5, the quantities of components (B) or (C) are varied to show the effect on physical properties. These variables and their effects on the physical properties of each composition when cured on aluminum panels are shown in the following table.

TABLE II

| | Polyester Based Compositions Examples 1–5 | | | | |
|---|---|---|---|---|---|
| Example No. | 1 | (Control) 2 | (Control) 3 | 4 | 5 |
| Component (A) (10% solvent) | 5 g | 5 g | 5 g | 5 g | 5 g |
| Component (B) | 1.64 g | — | 1.64 g | 1.64 g | 3.00 g |
| Component (C) | 2.43 g | 1.93 g | 2.27 g | 2.61 g | 3.80 g |
| z/(x + y) | 2 g | 2.3 g | 1.9 g | 2.2 g | 2.5 g |
| Component (D) | .09 g | .09 g | .09 g | .09 g | .09 g |
| Physicals | | | | | |
| Hot Tack | None | None | None | None | None |
| Reverse Impact (in-lb) | 20–30 | 20–30 | 10–20 | 20–30 | 20–30 |
| Weight Loss | 14% | 37% | 29% | 22% | 31% |
| Component (B) Retention | 100% | — | 47% | 82% | 100% |
| Water Resistance at 10 min. boil | no delam. 25% blush | delamination | 50% delam. 50% blush | no delam. 15% blush | 15% delam. |

EXAMPLE 6

Pigmented Composition

In the manner of Examples 3–5, a composition of the invention is prepared to which titanium dioxide is added as a pigment. About 31.9 grams Cargill Polyester 5760, about 51.4 grams titanium dioxide pigment, about 0.56 gram of a solution of a commercial surfactant sold as Silicone L-5310 by Union Carbide (50 percent active), and 15.6 grams of the polypropylene glycol monoether component (B) of Examples 3–5, are mixed to disperse the pigment. In a separate batch, 18.1 grams of the polyester, 24.25 grams of Resimene 745 hexamethoxymethyl melamine (marketed by Monsanto Chemical), 0.5 gram of the same polypropylene glycol monoether and 1.1 grams of Permagil L-1457-A catalyst (a toluenesulfonic acid ammonium salt) Component (D), are mixed. The two batches are then combined using a high shear mixer. The formulation is spread on an aluminum panel and cured at 150° C. for about 20 minutes. The cured coating exhibits no hot tack, has 95 percent polypropylene glycol monoether retention, reverse impact of between 20–30 inch pounds, is not affected by a 24 hour soaking in water and exhibits only tiny blisters after a 10 minute water boil.

EXAMPLES 7–13

Acrylic Based Compositions

About 3.5 grams of a commercial acrylic resin marketed as Acryloid AT-56 resin is blended, with 3.5 grams of a 90:10 (volume) xylene:n-butanol mixture as a control in Example 7, and with component (B) of Example 1 in Examples 8–13. To each is added, as component (C), Uformite MM47 melamine-formaldehyde resin (60 percent solids) and 0.12 gram of Permagil L-1457-A catalyst. In Examples 8–13, components (B) and (C) are varied to illustrate their effects on physical properties. After curing at about 150° C. for about 30 minutes, on aluminum panels, the properties exhibited by the cured coatings are shown in Table III, below.

TABLE III

| | Acrylic Based Composition | | | | | | |
|---|---|---|---|---|---|---|---|
| Example No. | (Control) 7 | 8 | 9 | 10 | 11 | 12 | 13 |
| Component (A)** | 7.0*** | 4.2 | 4.2 | 4.2 | 4.2 | 4.2 | 4.2 |
| Component (B) | — | 1.0 | 1.5 | 1.5 | 1.5 | 3.0 | 3.0 |
| Component (C) | 3.0 | 3.07 | 2.94 | 3.43 | 4.35 | 5.77 | 3.22 |
| Component (D) | 0.12 | 0.12 | 0.12 | 0.12 | 0.12 | 0.12 | 0.12 |
| z/(x + y) | 9.4 | 4.4 | 3.4 | 3.8 | 4.9 | 3.9 | 2.2 |
| Physicals | | | | | | | |
| Hot Tack | None | None | None | None | None | None | None |
| Weight Loss | 45% | 37% | 36% | 36% | 34% | 37% | 51% |
| Component (B) Retention | — | 100% | 94% | 100% | 100% | 97% | 28% |
| Water Resistance at 10 min boil | 5% delam. | no delam. | no delam. | 5% delam. | 75% delam. | 95% delam. | 60% delam. |

*Components (A)–(D) are all parts by weight.
**Includes 16% solvent - 90/10 (vol.) xylene/n-butanol.
***Includes 50% solvent - 90/10 (vol.) xylene/n-butanol.

EXAMPLE 14–17

Epoxy Based Compositions

About 7.0 grams of a commercial epoxy resin marketed as D.E.R. 667 epoxy resin by The Dow Chemical Company is combined with 7.0 grams of ethoxyethyl acetate for the control (Example 14) or 7.0 grams component (B) of Example 1. To this mixture is added varied amounts of component (C) and 0.12 gram of component (D) of Example 6. After curing at about 175° C. for about 30 minutes, on aluminum panels, the properties exhibited by the cured coatings are tested and shown in Table IV, below.

TABLE IV

| | Epoxy Based Compositions | | | |
|---|---|---|---|---|
| Example No. | (Control) 14 | 15 | 16 | 17 |
| Component (A)* Ethoxyethyl Acetate* | 7.0 7.0 | 7.0 — | 7.0 — | 7.0 — |
| Component (B)* | — | 7.0 | 7.0 | 7.0 |
| Component (C)* | 9.22 | 15.02 | 24.40 | 30.03 |
| Component (D)* | 0.12 | 0.12 | 0.12 | 0.12 |
| z/(x + y) | 8.5 | 4.0 | 6.5 | 8.0 |
| Physicals | | | | |
| Hot Tack | None | None | None | None |
| Weight Loss | 48% | 49% | 46% | 45% |
| Component (B) Retention | — | 52% | 99% | 100% |
| Water Resistance at 60 min boil | 100% blush | no effect | no effect | no effect |

*Components (A)–(D) and Ethoxyethyl Acetate are all parts by weight.

EXAMPLES 18–21

Water-Borne Polyester Compositions

About 2.77 grams (8.7 percent solvent) of a commercial water-borne polyester resin marketed as Arlon 465 resin, component (A), is mixed with 1.27 grams of ethoxyethyl acetate for a control in Example 18 and with 1.27 grams of component (B) of Example 1 in Examples 19–21. To these are added varying amounts of Cymel 301 hexamethoxymethyl melamine as component (C), 3.05 grams water, and 0.12 gram of component (D) of Example 6. After curing at about 150° C. for a period of about 30 minutes, on aluminum panels, the properties exhibited by the cured coatings are tested and shown in Table V, below.

TABLE V

| | Water-Borne Polyester Compositions | | | |
|---|---|---|---|---|
| Example No. | (Control) 18 | 19 | 20 | 21 |
| Component (A)* Ethoxyethyl Acetate* | 2.77 1.27 | 2.77 — | 2.77 — | 2.77 — |
| Water* | 3.05 | 3.05 | 3.05 | 3.05 |
| Component (B)* | — | 1.27 | 1.27 | 1.27 |
| Component (C)* | 0.65 | 2.16 | 2.70 | 3.24 |
| Component (D)* | 0.12 | 0.12 | 0.12 | 0.12 |
| z/(x + y) | 2.5 | 4.0 | 5.0 | 6.0 |
| Physicals | | | | |
| Hot Tack | None | None | None | None |
| Reverse Impact (in-lb) | 30–40 | 20–30 | ~30 | ~30 |
| Weight Loss | 63% | 51% | 48% | 48% |
| Component (B) Retention | — | 80% | 100% | 100% |
| Water Resistance at 60 min boil | 100% blush blisters | small blisters | small blisters | small blisters |

*Components (A)–(D), Ethoxyethyl Acetate, and Water are all parts by weight.

EXAMPLES 22–25

Acrylic Latex Based Compositions

A mixture of 2.5 grams of an acrylic latex (38 percent solids) having a hydroxyl equivalent weight of 867 and comprising butyl acrylate units, styrene units, hydroxypropyl acrylate units and methacrylic acid units as component (A), with 0.3 gram of DOWANOL EPh glycol ether, the phenyl ether of ethylene glycol (boiling point ~245° C.) in Control Examples 22–23 and with 0.3 gram of component (B) of Example 1 in Examples 24–25 is prepared. To this is added varied amounts of component (C) of Examples 18–21 and 0.02 gram of component (D) of Example 6. After curing for about 30 minutes at about 150° C., on aluminum panels, the properties exhibited by the cured coatings are tested and shown in Table VI, below.

TABLE VI

| | Acrylic Latex Based Compositions | | | |
|---|---|---|---|---|
| Example No. | (Control) 22 | (Control) 23 | 24 | 25 |
| Component (A)* (62% water) | 2.5 | 2.5 | 2.5 | 2.5 |
| Ethylene glycol Phenyl ether* | 0.3 | 0.3 | — | — |
| Component (B)* | — | — | 0.3 | 0.3 |

TABLE VI-continued

| | Acrylic Latex Based Compositions | | | |
|---|---|---|---|---|
| | (Control) | (Control) | | |
| Example No. | 22 | 23 | 24 | 25 |
| Component (C)* | 0.22 | 1.08 | 0.44 | 0.72 |
| Component (D)* | 0.02 | 0.02 | 0.02 | 0.02 |
| z/(x + y) | 2.9 | 5.0 | 3.0 | 5.0 |
| Physicals | | | | |
| Hot Tack | None | None | None | None |
| Reverse Impact (in-lb) | <10 | <10 | 10–20 | 10–20 |
| Weight Loss | 63% | 60% | 63% | 54% |
| Component (B) Retention | — | — | 11% | 100% |
| Water Resistance at 60 min boil | 40% delam. | 30% delam. | 2% delam. | 10% delam. |

*Components (A)–(D) and Ethylene glycol Phenyl ether are all parts by weight.

EXAMPLES 26–28

Varied Reactive Diluents

Example 1 is repeated substituting 1.64 grams of varied diluents of the formula

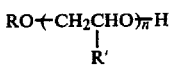

for component (B). After curing in the manner described in Example 1, the properties exhibited by the cured coatings are tested and shown in Table VII, below.

TABLE VII

| | Varied Reactive Diluents | | |
|---|---|---|---|
| Example No. | 26 | 27 | 28 |
| Component (A)* (10% solvent) | 5.0 | 5.0 | 5.0 |
| Component (B)* | 1.64 | 1.64 | 1.64 |
| R | $C_{13}H_{28}$ | $CH_3$ | $C_4H_9$ |
| R' | All H | All $CH_3$ | All $CH_3$ |
| n | 3 | 5.5 | 8 |
| Component (C)* | 2.29 | 2.25 | 2.06 |
| Component (D)* | 0.09 | 0.09 | 0.09 |
| z/(x + y) | 2 | 2 | 2 |
| Physicals | | | |
| Hot Tack | None | None | None |
| Reverse Impact (in-lb) | 20–30 | ~30 | >40 |
| Weight Loss | 19% | 20% | 15% |
| Component (B) Retention | 100% | 96% | 100% |
| Water Resistance at 60 min boil | 5% delam. 90% blush | no delam. no blush | no delam. 50% delam. |

*Components (A)–(D) are all parts by weight.

What is claimed is:

1. A curable composition comprising:
(A) 100 parts by weight of a non-aminoplast hydroxyl-bearing polymer capable of curing with an aminoplast or phenolic resin which represents x-hydroxyl equivalents;
(B) about 5 to about 100 parts by weight which represents y-hydroxyl equivalents of a (poly)glycol monoether represented by the formula:

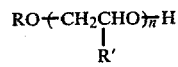

wherein R is a hydrocarbyl group of one to about twenty carbon atoms, R' is independently, each occurrence, hydrogen, methyl or ethyl, and n is a positive number, said (poly)glycol monoether having an atmospheric boiling point of about 300° C. or greater;
(C) an aminoplast or phenolic resole resin, capable of curing component (A) to a tack-free state, present in a quantity such that z equivalents of said resin are present, z being equal to from about 2(x+y) up to about 10(x+y); and
(D) a catalytic amount of a catalyst which catalyzes the reaction between components (A) and (C).

2. The composition of claim 1 wherein component (A) is selected from the group consisting of free-hydroxyl containing polyester, free-hydroxyl containing solid epoxy resins, and homo- and copolymers of vinyl alcohol, hydroxyalkylacrylates and α,β-unsaturated acids.

3. The composition of claim 1 wherein component (B) has an atmospheric boiling point of about 310° C. or greater.

4. The composition of claim 1 wherein in component (B), R' is methyl in one or more occurrences.

5. The composition of claim 1 wherein in component (B), R' is methyl in the majority of occurrences.

6. The composition of claim 1 wherein in component (B), n is equal to about 4 or greater.

7. The composition of claim 1 wherein in component (B), R' each occurrence is methyl, n is equal to about 4 or greater and R is methyl.

8. The composition of claim 1 wherein component (C) is a melamine-formaldehyde resin.

9. The composition of claim 1 wherein in component (C), z is equal to from about 2.5(x+y) up to about 8(x+y).

10. The composition of claim 1 wherein from about 0.05 to about 2 parts by weight of component (D) are present.

11. The composition of claim 1 wherein component (D) is selected from toluenesulfonic acid, sulfuric acid, ammonium salts of either, and boron trifluoride.

12. The composition of claim 1 wherein component (A) is a free-hydroxyl containing polyester, component (B) is a polyglycol monoether wherein R is methyl, R', each occurrence, is methyl and n is equal to about 4 or greater, component (C) is a hexamethoxymethyl melamine and component (D) is paratoluenesulfonic acid, sulfuric acid or the ammonium salt of either.

13. The composition of claim 1 wherein in component (B) the number of carbon atoms in R and

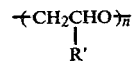

combined total about 12 or greater.

14. The composition of claim 1 which has been heated at a temperature and for a length of time sufficient to cure same to a tack-free finish.

15. The composition of claim 1 which further comprises a pigment.

16. The composition of claim 1 wherein Component B is present in an amount from about 10 to about 100 parts by weight and R' is independently, each occurrence, hydrogen or methyl.

* * * * *

UNITED STATES PATENT AND TRADEMARK OFFICE
CERTIFICATE OF CORRECTION

PATENT NO. : 4,256,622
DATED : March 17, 1981
INVENTOR(S) : Harry A. Smith

It is certified that error appears in the above—identified patent and that said Letters Patent is hereby corrected as shown below:

Col. 1, line 53, "hydroxy-" should read --hydroxyl- --.

Col. 2, line 18, "hydroxy-" should read --hydroxyl- --.

Col. 2, line 56, "hydroxy-" should read --hydroxyl- --.

Col. 10, in claims 2 through 15, after the phrase "Claim 1" insert --or 16--.

Signed and Sealed this

Twenty-ninth Day of September 1981

[SEAL]

Attest:

GERALD J. MOSSINGHOFF

Attesting Officer

Commissioner of Patents and Trademarks